United States Patent
Hennel et al.

(10) Patent No.: US 6,234,759 B1
(45) Date of Patent: May 22, 2001

(54) METHOD FOR REGULATING A FLUID PRESSURE

(75) Inventors: Ewald Hennel, Mecklenheidestrasse 61, D-30419; Maik Hennel, both of Hannover (DE)

(73) Assignee: Ewald Hennel, Hannover (DE)

( * ) Notice: Subject to any disclaimer, the term of this patent is extended or adjusted under 35 U.S.C. 154(b) by 0 days.

(21) Appl. No.: 09/354,171

(22) Filed: Jul. 16, 1999

(30) Foreign Application Priority Data

Jul. 16, 1998 (DE) .............................................. 198 31 997

(51) Int. Cl.[7] .................................................... F04B 45/06
(52) U.S. Cl. .............................................................. 417/44.1
(58) Field of Search ................................ 417/44.1, 44.2, 417/43

(56) References Cited

U.S. PATENT DOCUMENTS

| | | | | |
|---|---|---|---|---|
| 4,248,194 | * | 2/1981 | Drutchas et al. | 123/357 |
| 5,269,660 | * | 12/1993 | Pradelle | 417/18 |

FOREIGN PATENT DOCUMENTS

| | | |
|---|---|---|
| 42 43 118 | 6/1994 | (DE) . |
| 0 309 596 | 4/1989 | (EP) . |
| 0 390 627 | 10/1990 | (EP) . |
| 2 293 403 | 3/1996 | (GB) . |
| 62-093498 | 4/1987 | (JP) . |
| 08095645 | 4/1996 | (JP) . |
| 08232883 | 9/1996 | (JP) . |

* cited by examiner

Primary Examiner—Teresa Walberg
Assistant Examiner—Vinod D Patel
(74) Attorney, Agent, or Firm—Venable; Gabor J. Kelemen

(57) ABSTRACT

Specified is a method for regulating the pressure of a fluid, moved through a pipe system with at least one consumer by a pressure generator, driven with an electric motor. In order to ensure a sufficient supply for all consumers on a continuous basis, the motor speed for adjusting the pressure in the pipe system is regulated by way of a controller. At least one control curve reflecting the fluid pressure in the pipe system in dependence on the amount of the fluid flowing through or the flow speed of the fluid is impressed into the controller. The control curve extends with a uniform curvature between a predetermined pressure minimum and a predetermined pressure maximum, such that in the direction of increasing pressure, it is located above a straight line connecting the points of minimum pressure and maximum pressure and is at the greatest distance from this straight line in the center region between the two points. The controller is supplied continuously with an electrical variable as actual value, which is proportional to the amount of fluid flowing through or the flow speed of the fluid. If the actual value deviates from the desired pressure value, specified according to the corresponding control curve, the motor speed is adjusted so as to compensate for this.

10 Claims, 2 Drawing Sheets

METHOD FOR REGULATING A FLUID PRESSURE

CROSS-REFERENCE TO RELATED APPLICATION

This application claims the priority of Patent Application Ser. No. DE 19831997.5, filed in Germany on Jul. 16, 1998, the subject matter of which is incorporated herein by reference.

BACKGROUND OF THE INVENTION

The invention relates to a method for regulating the pressure of a fluid that is moved through a system of pipes having at least one consumer. The fluid is moved by a pressure generator driven by an electric motor.

The "fluid" within the meaning of the invention can include, for example, water, steam or gas. The method is used, for example, in locations where increased fluid pressure is required to supply many consumers, such as is the case with multi-storied buildings or hotels where a sufficient pressure is necessary at each water extraction point. The same is also true for large heating plants or gas supply facilities. Accordingly, the "pressure generator" can be a pump or a compressor. As an example of the possible applications, the method is described in the following for a pump-operated water supply.

The maximum pressure necessary for supplying all extraction points connected as consumers to a pipe system for the water supply, for example, can be determined with the aid of a calculation. Even though this maximum pressure is only needed if all consumers want to have water, facilities of this type are consistently operated with a constant maximum pressure, involving a high expenditure of energy for operating the pump units, as well as increased wear on the pumps and valves. Furthermore, maintaining a continuous high pressure will stress the pipes, so that pipe breaks occur relatively frequently. Finally, disturbing flow noises often occur.

It is the object of the invention to improve the above-described method in such a way that the stress on the pipe system with associated units can be reduced.

SUMMARY OF THE INVENTION

This object is solved according to the invention in that:
the motor speed for regulating the pressure in the pipe system is adjusted by a controller with at least one control curve impressed into it, which is designed to reflect the fluid pressure in the pipe system in dependence on the amount of fluid flowing through or the flow speed for the fluid, which control curve extends between a predetermined minimum and a predetermined maximum of the pressure and is uniformly curved in such a way that in the direction of increasing pressure it is located above a straight line, connecting the points of minimum pressure and maximum pressure, and that in the center region between the two points it is at the greatest distance from the line;
an electrical variable that is proportional to the amount of fluid flowing through or the flow speed of said fluid is continuously supplied to the controller as an actual value;
if the actual value deviates from the desired pressure value according to the control curve, the motor speed is adjusted to compensate for this.

With this method, the energy requirement for operating the pump unit is minimized because only the pressure needed to supply actually switched-on consumers is generated continuously. In the process and owing to the curved course of the control curve, the pipe system is constantly provided with a slightly increased amount of pressure, so that the respective fluid starts flowing immediately and with certainty if an extraction point in the pipe system is opened. The control curve furthermore avoids an overshooting or undershooting of the control operation, which could derail the complete process. The wear on pump units and valves is reduced. Pipe breaks can be avoided for the most part because only the pressure necessary for the water to flow is continuously present in the pipe system. Disturbing flow noises do not occur any longer. Finally, it is possible to use smaller pressure compensation containers. The method is suitable in particular for higher pressures above 6 bar.

BRIEF DESCRIPTION OF THE DRAWINGS

These and other features and advantages of the invention will be further understood from the following detailed description of the preferred embodiments with reference to the accompanying drawings in which.

DETAILED DESCRIPTION OF THE PREFERRED EMBODIMENTS

The following description also relates to supplying water to extraction points by means of a pump, without limiting the initially mentioned application range of the invention. For a further simplification, the words "pump speed" are used in place of the words "speed of the motor driving the pump."

Figure 1:
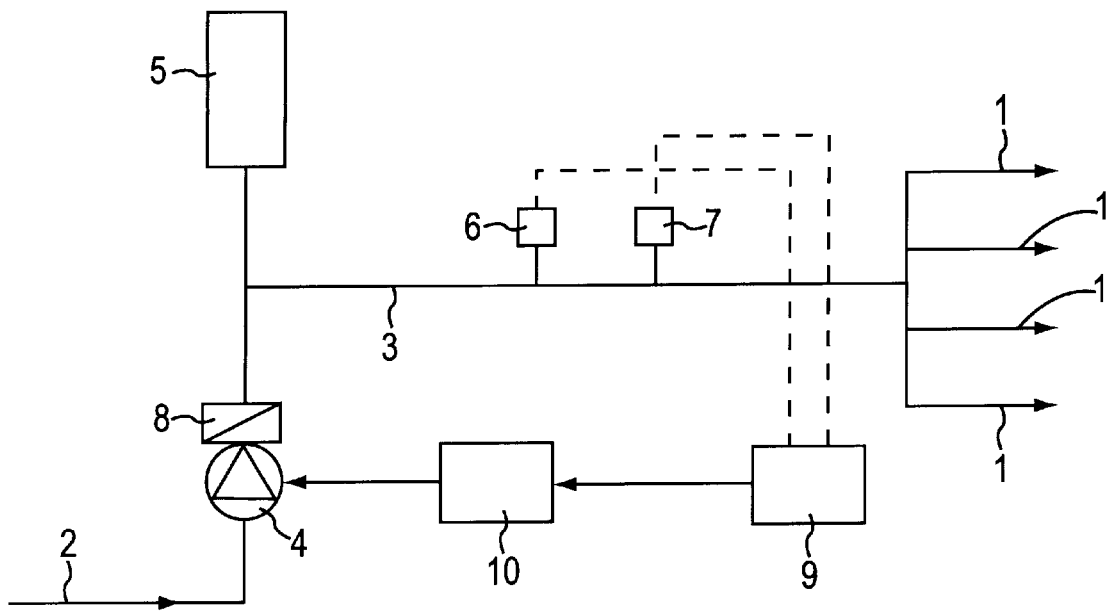
FIG. 1 shows a diagram of a plant for which the method according to the invention can be used.

FIG. 1, for example, schematically illustrates a water supply system for a multi-storied building. The pipe system and its consumers, meaning the extraction points, installed in the multi-storied building, are only indicated with the four arrows 1. The water supplied via a pipeline 2 is pushed through a pipe 3 by means of a pump 4 and into the pipe system 1. The pump 4 is driven by a non-depicted, electric motor with adjustable speed. A pressure compensation container 5, a flow sensor 6 and a pressure meter 7 are connected to the pipe 3. A return valve 8 can also be installed in the pipe 3.

Figure 2:
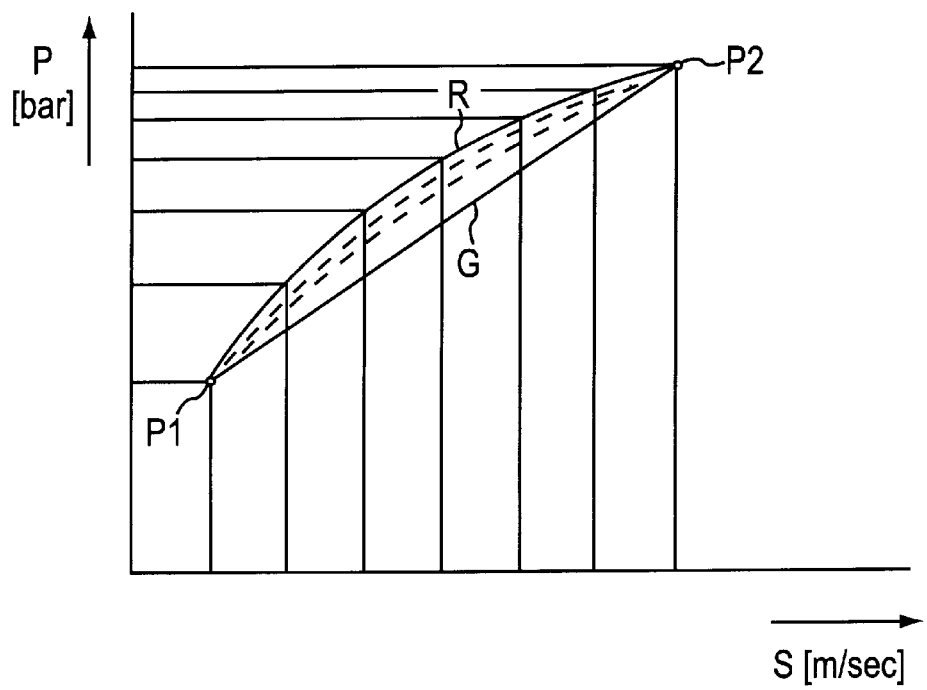
FIG. 2 shows control curves used with this method.

The flow sensor 6 and the pressure meter 7 are electrically connected to a controller 9 for regulating the speed of pump 4 via a converter 10, e.g., a frequency converter. Control curves R are impressed on the controller 9, as can be seen in FIG. 2. In FIG. 2, the pressure P of the water inside the pipe system is plotted in bar, that is above the flow speed S in m/s for the same. In place of the flow speed S, it would also be possible to use the amount of water transported in m³/hour, provided a device for detecting the amount flowing through is used in place of the flow sensor 6.

The control curve R extends uniformly curved between a point P1 of minimum pressure and a point P2 of maximum pressure. The curvature of the control curve R in the direction of increasing pressure is directed away from a straight line G, which connects the points P1 and P2. The distance between the control curve R and the straight line G is greatest in the center region.

The control curve R as described herein can have a varied course and be at a greater or smaller distance from the straight line G. Corresponding control curves are additionally drawn into FIG. 2 with dashed lines. The respective course of the control curve R is based on the flow resistance of the pipe system 1 to be supplied. This resistance can be calculated prior to using the method with the standard technique. In the process, the minimum pressure is also determined. The maximum required pressure follows from the flow resistance of the pipe system 1.

The method according to the invention, for example, works as follows:

The method or the plant to be supplied must initially be calibrated. For this, the flow resistance of the pipe system 1 is computed, and the points P1 of minimum pressure and P2 of maximum pressure are specified. A control curve R for the controller 9 is subsequently determined. The method can then be implemented by starting the operation of pump 4. Following the start-up of pump 4, water is pushed into the pipe system 1. The flow speed S of the water inside the pipe 3 depends on the number of opened extraction points. The flow speed is detected by the flow sensor 6 and is fed as, actual value to the controller 9 in the form of an electrical variable. A pressure P that must be generated by the pump 4 is assigned via the control curve R to each value for the flow speed S. The controller 9 constantly feeds electrical signals to the converter 10, which signals are used to regulate the speed of pump 4 and adjust it to the desired value according to the control curve R. The corresponding "correct" pressure P can be monitored with the pressure meter 7, which is connected electrically to the controller 9.

The speed of pump 4, and thus the pressure P in the pipe system 1, is regulated with the aid of a control curve R with a curved course, meaning it is not linear, between the points P1 and P2 of maximum pressure and minimum pressure. The control curve R approximately follows the course of an e-function. In this way, it is ensured that individual extractions points do not experience low supply, despite the controlled pressure P in the pipe system 1, since the pressure is always higher than it would be with a linear control, except for the two end points P1 and P2 of the control curve R. Consequently, the water starts flowing immediately at each extraction point as soon as the tap is opened. Still, there is also no oversupply at the extraction points since the water pressure P in the pipe system 1 is constantly adapted to the flow speed S of the water and thus to the actual consumption.

The pump 4 can be operated constantly with a speed corresponding to the minimum pressure P1, but only if the water consumption is low. However, it can also be shut down if the flow speed S of the water falls below the value corresponding to point P1. Since the flow speed S of the water in that case is also measured constantly, an increase in the flow speed is detected immediately, so that the pump 4 can be started up again and can be adjusted to the correct speed.

In order to increase the safety of the method, the controller 9 can be provided with a flow unit which, for example, reacts in the event that the flow sensor 6 fails. The pump speed 4 is then held at a constant value, which corresponds to a pressure above P1, until the malfunction is corrected. For this, an optical and/or acoustical signal can also be triggered automatically, which is designed to draw attention to the malfunction.

Figure 3:
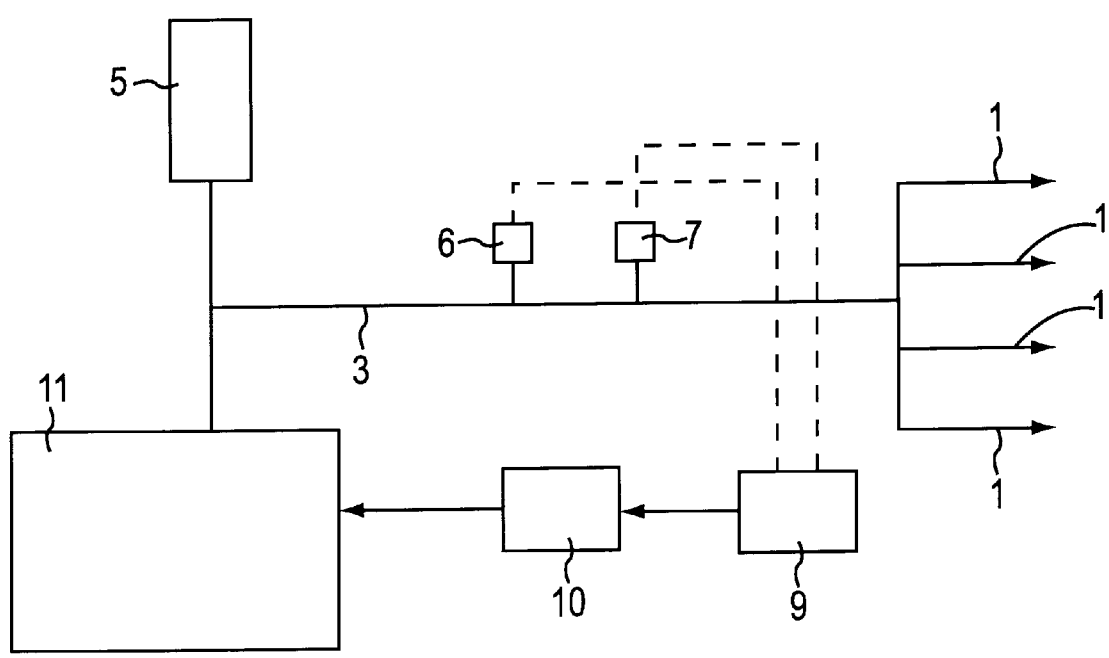
FIG. 3 shows a different plant as compared to FIG. 1.

According to FIG. 3, the method is also suitable for use with a compressor system for supplying consumers with gas. The same parts as in FIG. 1 are given the same reference numbers in FIG. 3. Thus, only the pump 4 is replaced by a compressor 11 and the fluid to be moved is not water but gas. In the same way as the pump 4, the compressor system 11 is driven by an electric motor with adjustable speed. According to FIG. 2, the motor speed is again regulated by the controller 9 based on a control curve R. The flow speed S for the gas in pipe 3 is transmitted to this controller as an actual value with the aid of an electrical signal from the flow sensor 6, which could be replaced—as described in connection with FIG. 1—by a device detecting the amount flowing through.

It will be understood that the above description of the present invention is susceptible to various modifications, changes and adaptations, and the same are intended to be comprehended within the meaning and range of equivalents of the appended claims.

What is claimed is:

1. A method for regulating the pressure of a fluid moved through a pipe system, the pipe system having at least one consumer, using a means for generating pressure driven by an electric motor, the method comprising the steps of:

determining an electrical value proportional to a variable indicative of the motion of the fluid;

supplying the electrical value to a controller, the controller having at least one control curve impressed into it, said at least one control curve reflecting fluid pressure in the pipe system in dependence on said variable, said at least one control curve extending with a uniform curvature between a predetermined minimum pressure value and a predetermined maximum pressure value in such a way that, in the direction of increasing pressure, said at least one control curve is located above a straight line connecting points corresponding to the minimum and maximum pressure values and in such a way that said at least one control curve is at the greatest distance from the straight line in a center region between the points corresponding to the minimum and maximum pressure values, the controller controlling the speed of the electric motor to regulate the pressure within the pipe system; and adjusting the speed of the electric motor to compensate if, based on the electrical value, the variable deviates from a desired value for the pressure according to said at least one control curve.

2. The method according to claim 1, wherein the variable indicative of the motion of the fluid is flow speed.

3. The method according to claim 1, wherein the variable indicative of the motion of the fluid is the amount of fluid moving through the pipe system.

4. The method according to claim 1, wherein said at least one control curve comprises various control curves dependent upon flow resistances for various pipe systems.

5. The method according to claim 1, further comprising the steps of:

automatically switching off the electric motor if the variable corresponds to the minimum pressure value; and automatically restarting the electric motor if the variable increases above its value corresponding to the minimum pressure value.

6. The method according to claim 1, further comprising the steps of:

continuously measuring the pressure in the pipe system; and supplying the measured value of the pressure to the controller.

7. The method according to claim 1, wherein said minimum pressure value is 6 bar.

8. The method according to claim 1, further comprising the step of:

calibrating the method prior to using it for regulating pressure.

9. The method according to claim 8, wherein said step of calibrating comprises the steps of:

computing flow resistance of the pipe system; and specifying minimum and maximum pressure values.

10. The method according to claim 9, wherein said step of calibrating further comprises the step of:

determining a control curve.

* * * * *